United States Patent
Ani et al.

(10) Patent No.: US 8,253,557 B2
(45) Date of Patent: Aug. 28, 2012

(54) SYSTEM AND METHOD FOR TRACKING LUGGAGE

(76) Inventors: Nasser Ani, Holmdel, NJ (US); Samar Shami, Holmdel, NJ (US); Fares Ani, Holmdel, NJ (US)

(*) Notice: Subject to any disclaimer, the term of this patent is extended or adjusted under 35 U.S.C. 154(b) by 927 days.

(21) Appl. No.: 12/036,446

(22) Filed: Feb. 25, 2008

(65) Prior Publication Data

US 2009/0040101 A1     Feb. 12, 2009

Related U.S. Application Data

(60) Provisional application No. 60/954,462, filed on Aug. 7, 2007.

(51) Int. Cl.
*G08B 1/08* (2006.01)

(52) U.S. Cl. ........... 340/539.13; 340/539.1; 340/539.11; 340/539.15; 340/539.16; 340/539.17; 340/572.1

(58) Field of Classification Search .... 340/572.1–572.9, 340/539.13, 539.11, 539.1, 539.15–539.17, 340/686.1
See application file for complete search history.

(56) References Cited

U.S. PATENT DOCUMENTS

| | | | |
|---|---|---|---|
| 5,576,692 A | 11/1996 | Tompkins et al. | |
| 6,222,452 B1 | 4/2001 | Ahlstrom et al. | |
| 6,265,975 B1 | 7/2001 | Zimmerman | |
| 6,396,403 B1 | 5/2002 | Haner | |
| 6,476,718 B1 | 11/2002 | Cartwright et al. | |
| 6,650,240 B2* | 11/2003 | Lee et al. | 340/572.1 |
| 6,700,533 B1 | 3/2004 | Werb et al. | |
| 6,847,892 B2 | 1/2005 | Zhou et al. | |
| 6,859,171 B2 | 2/2005 | Durst et al. | |
| 6,933,851 B2* | 8/2005 | Hahne et al. | 340/573.4 |
| 6,975,222 B2 | 12/2005 | Krishan et al. | |
| 6,994,194 B2 | 2/2006 | Smith | |
| 7,034,690 B2* | 4/2006 | Chaco | 340/573.1 |
| 7,123,141 B2* | 10/2006 | Contestabile | 340/539.13 |
| 7,126,470 B2 | 10/2006 | Clift et al. | |
| 7,199,712 B2 | 4/2007 | Tafas et al. | |
| 7,224,308 B2 | 5/2007 | Butler et al. | |
| 7,236,789 B2 | 6/2007 | Beuck | |
| 7,266,448 B2 | 9/2007 | Park et al. | |
| 7,535,358 B2* | 5/2009 | Crider et al. | 340/572.1 |

(Continued)

OTHER PUBLICATIONS

International Preliminary Report on Patentability for PCT Application No. PCT/US2008/072191 mailed Feb. 18, 2010.

(Continued)

*Primary Examiner* — Daniel Wu
*Assistant Examiner* — Ryan Sherwin
(74) *Attorney, Agent, or Firm* — Robert M. McCarthy; Moser Taboada

(57) ABSTRACT

A system for tracking an object including a tracking station in communication with a network. The system includes a first tag coupled to the object, the first tag comprising a first tag identifier and a first GPS transmitter. The first GPS transmitter is effective to communicate the location of the first tag to the tracking station over the network. The system also includes a second tag comprising a second tag identifier and a second GPS transmitter effective to communicate the location of the second tag to the tracking station over the network. The system also includes a database in communication with the tracking station, the database is effective to associate the first tag identifier with the second tag identifier. A user may access the database through the network and ascertain the location of his luggage.

19 Claims, 3 Drawing Sheets

U.S. PATENT DOCUMENTS

| | | | |
|---|---|---|---|
| 7,728,724 B1 * | 6/2010 | Scalisi et al. | 340/539.13 |
| 2002/0014955 A1 * | 2/2002 | Klitsgaard | 340/10.42 |
| 2004/0222898 A1 * | 11/2004 | Gabig et al. | 340/825.49 |
| 2004/0246097 A1 * | 12/2004 | Queenan | 340/5.61 |
| 2005/0275531 A1 | 12/2005 | Johnson | |
| 2006/0220857 A1 * | 10/2006 | August et al. | 340/572.1 |
| 2006/0279422 A1 * | 12/2006 | Sweatte | 340/539.13 |
| 2007/0013519 A1 | 1/2007 | Chung et al. | |
| 2007/0046464 A1 | 3/2007 | Onderko et al. | |
| 2007/0103313 A1 * | 5/2007 | Washington | 340/572.8 |
| 2008/0129488 A1 * | 6/2008 | Hill | 340/539.13 |

OTHER PUBLICATIONS

Form PCT/ISA/210 PCT International Search Report.

* cited by examiner

SYSTEM AND METHOD FOR TRACKING LUGGAGE

This patent application claims the priority of U.S. Provisional Application Ser. No. 60/954,462, filed Aug. 7, 2007, entitled "System and Method for Tracking Luggage," the entirety of which is incorporated by reference herein.

FIELD OF THE INVENTION

The invention relates generally to a system and method for tracking an object. More particularly, the invention relates to a system and method of tracking luggage using global positioning system tags and a tracking station.

BACKGROUND OF THE INVENTION

Misplaced luggage is a growing problem in the travel industry. The increasing volume of air traffic and the increasing congestion in airports contribute to flight delays and misplaced luggage. Although adhesive paper tags bearing the intended destination of a passenger's luggage have been used for decades, luggage is often misplaced and mishandled. Air travelers worry whether their luggage will arrive at their intended destination and often have to extend their time at baggage carousels while waiting for luggage that may not arrive. This is a particularly pressing problem for business travelers whose luggage may contain time sensitive materials.

In addition, even with increased security measures at airports, there still exists a chance that an item of luggage may end up in an aircraft which is not transporting the corresponding passenger. Alternatively, a passenger may enter an aircraft and his or her luggage may not be in that aircraft. If luggage is misplaced, the luggage may end up at a different location than the passenger's intended destination resulting in unsatisfied passengers and increased costs for the airline to deliver the luggage to its correct destination.

Traditional luggage identification systems suffer from deficiencies inherent in their structure. Printed paper tags attached by adhesives during check-in require inspection by security personnel, which is both time-consuming and prone to human error. Bar codes and other forms of optical identification used by airports are also prone to error. Each item of luggage must be individually scanned and such scanning does not guarantee that the luggage will be placed on the correct aircraft. Further, these paper tags are flimsy and may fall off or be torn off resulting in misrouted luggage.

Several systems have been implemented to remedy the problem of lost or misplaced bags. U.S. Pat. No. 5,576,692 describes a system for tracking luggage where a beeper device is attached to an article of luggage. If luggage is misplaced, a user calls a number associated with the beeper. The call causes the beeper to emit a sound alerting airline personnel in the immediate vicinity to the presence of the misplaced luggage. Airline personnel may subsequently contact the user and provide the user with the location of the misplaced luggage. This system, however, requires airline personnel to be vigilant in locating the misplaced baggage. Moreover, if no personnel are in the vicinity of the luggage, the luggage cannot be rerouted to its intended destination.

U.S. Pat. No. 6,222,452 describes a baggage identification system wherein a Radio Frequency Identification (RFID) label is placed in a luggage identification tag. The labels are detected by receiver stations located throughout an airport terminal. However, due to the limited range of RFID signals, multiple receiver stations are necessitated and must be placed throughout the terminal, which is neither cost-efficient or space-efficient. Further, the luggage may not be monitored when the tag is not in proximity to the tracking stations.

U.S. Pat. No. 7,199,712, describes an RFID system that can be used to identify the position of a passenger or their luggage in an aircraft. In this system, an RFID tag is placed on a passenger's ticket and RFID labels are attached to the passenger's luggage. A network of RFID readers is positioned inside the cabin of an aircraft and can be used to determine the location of luggage and the passenger. The system is limited inasmuch as the readers must be relatively close to the corresponding tag for the system to work.

Current systems are not designed to track luggage over long ranges. The limitations of the systems which employ RFID or visual identification limit the efficacy of luggage tracking and fail to ensure that luggage is loaded onto the same aircraft as a corresponding passenger.

SUMMARY OF THE INVENTION

An embodiment of the invention is drawn to a system for tracking an object including a tracking station in communication with a network. The system includes a first tag coupled to the object, the first tag comprising a first tag identifier and a first GPS transmitter. The first GPS transmitter effective to communicate the location of the first tag to the tracking station over the network. The system also includes a second tag comprising a second tag identifier and a second GPS transmitter, which is effective to communicate the location of the second tag to the tracking station over the network. The system also includes a database in communication with the tracking station, the database effective to associate the first tag identifier with the second tag identifier.

Another embodiment of the invention is a method of tracking an object comprising the steps of assigning the object a first tag comprising a first tag identifier and a first GPS transmitter, assigning a passenger a second tag comprising a second tag identifier and a second GPS transmitter, and associating the first tag identifier and the second tag identifier in a database.

DETAILED DESCRIPTION OF THE PREFERRED EMBODIMENT(S)

Figure 1:
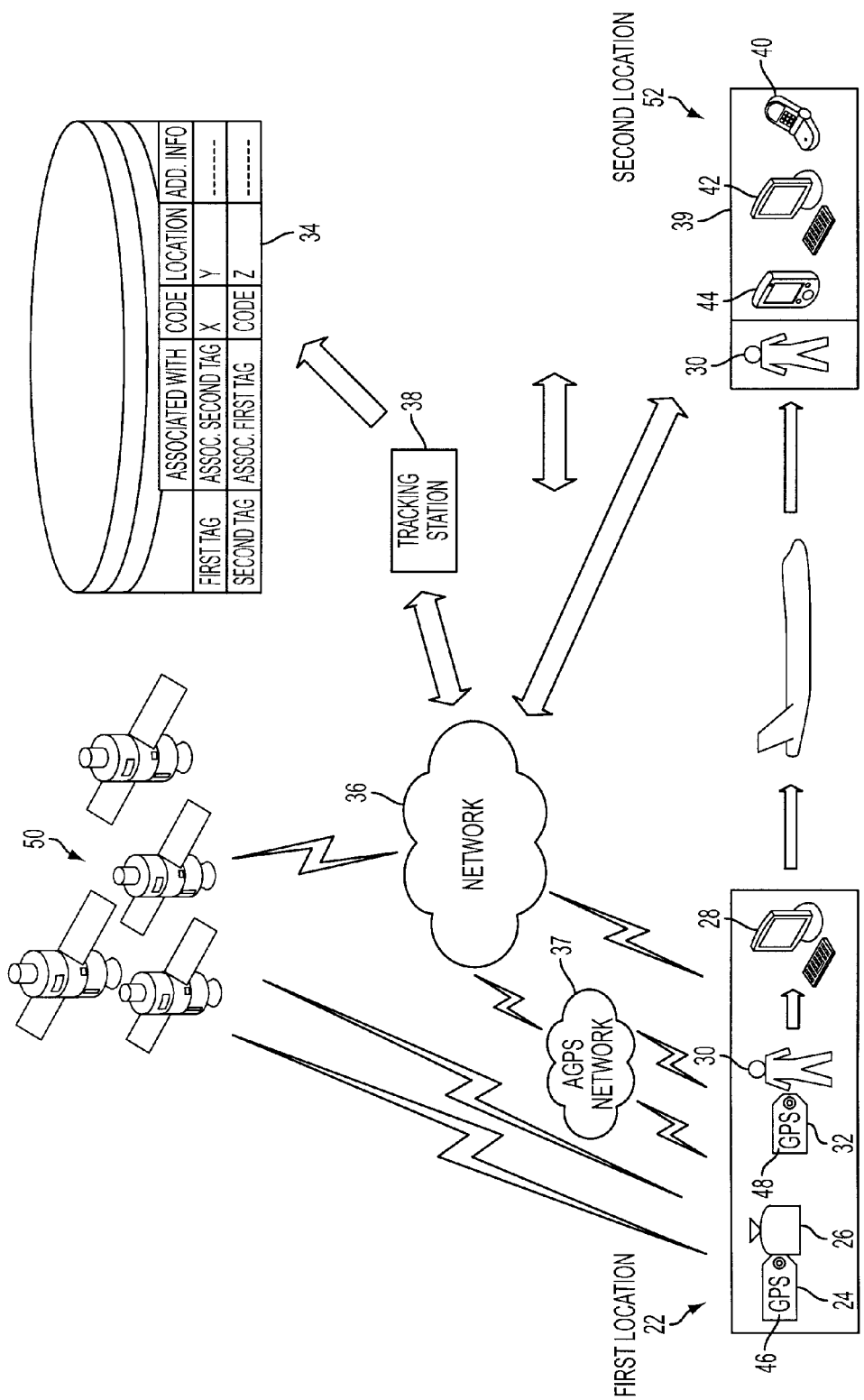
FIG. 1 is a system diagram illustrating a system for tracking luggage in accordance with an embodiment of the invention.

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

FIG. 1 illustrates a system 20 for tracking an object 26. Object 26 belongs to a passenger 30. Both passenger 30 and object 26 may travel from a first location 22 to a second location 52. At first location 22, which may be in an airport terminal, a train station, a bus terminal, etc., a first tag 24 is coupled to object 26. Second location 52 may be a destination airport terminal, train station, bus terminal, etc., where passenger 30 arrives at the conclusion of his or her flight. In advance of a flight, first tag 24 may be mailed to passenger 30, or purchased at location 22 who may couple first tag 24 to object 26 prior to arrival at first location 22 or at location 22. First tag 24 may be coupled to object 26 by means including locking, fixing, insertion into an interior compartment, etc. Object 26 may be luggage, such as, for example, suitcases, bags, boxes or any other article that passengers use to transport items. Object 26 may include a single item of luggage or multiple items of luggage with possibly multiple tags.

First tag 24 includes a first Global Positioning System ("GPS") transmitter 46 effective to communicate information regarding the location of first tag 24 to a plurality of GPS satellites 50. GPS Satellites 50 may include 24 medium earth orbit satellites arranged in a constellation and which transmit signals. GPS satellites 50 collect information from GPS transmitter 46 regarding the location, speed, and direction of first tag 24 at a given time and transmit the information through a network 36, such as the Internet, to a tracking station 38.

First tag 24 may include a wireless Assisted GPS (AGPS) device. If first tag 24 is out of range of GPS satellites 50, information regarding the location of first tag 24 may be transmitted from the AGPS device through a network 37, such as a cellular network, to network 36 and then to tracking station 38. The AGPS device can also send supplemental tracking information to GPS satellites 50 relating to first tag 24.

First tag 24 is preferably protected from environmental factors such as rain, snow and dust to maintain its longevity and functionality. To accomplish this protection, first tag 24 may be enclosed in a waterproof and shock proof casing protecting the functional components from potentially harmful interactions with the environment and from tampering.

First tag 24 may have a battery compartment for receiving batteries. The battery compartment may include a tamper-proof lock to prevent inadvertent deactivation. First tag 24 is configured to include a switch for activating and deactivating the tag. The tag could be activated by a soft switch under the control of software run by, for example, computer 28, and is password activated protected. First tag 24 further includes a power level indicator for indicating whether or not the tag needs a new battery or needs to be recharged.

Figure 2A:
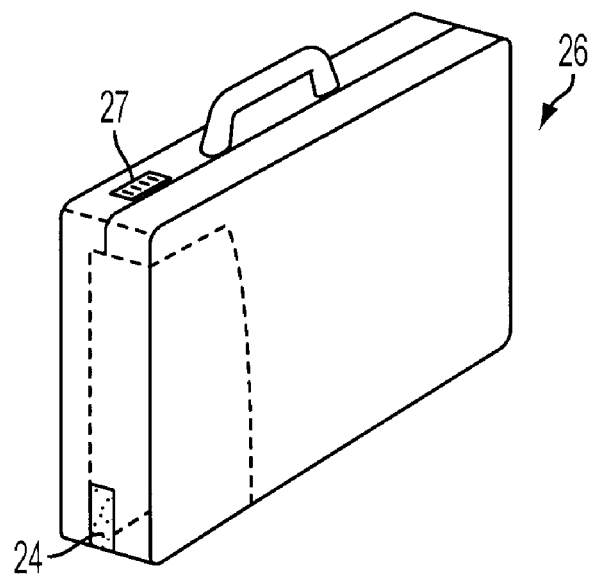
FIG. 2a is a perspective view of an item of luggage in accordance with an embodiment of the invention.
Figure 2B:
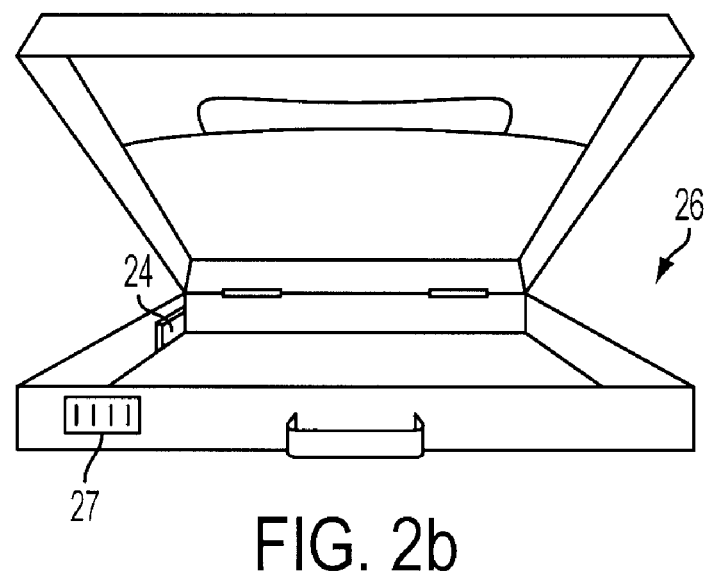
FIG. 2b is a top view of an item of luggage in accordance with an embodiment of the invention.

Referring to FIG. 2a and FIG. 2b, first tag 24 may be manufactured as part of object 26 such that first tag 24 can be attached to an interior or exterior surface of object 26. Object 26 may have an exterior identifier 27 such as a bar code or a series of numbers located on the surface of object 26, which corresponds to first tag 24. First tag 24 may, alternatively, be detachably mounted to object 26. The size and location of external identifier 27 may vary according to manufacturing standards.

Referring again to FIG. 1, at first location 22, a second tag 32 is given to passenger 30. Second tag 32 may be coupled to a passenger's ticket or alternatively, second tag 32 may be a separate device such as, for example, a handheld computer, PDA or cell phone. Second tag 32 includes a GPS transmitter 48 having a substantially similar function to GPS transmitter 46 described above. Passenger 30 is required to be in possession of second tag 32 in order to get past security and board an aircraft. Upon collection of object 26 at second location 52, passenger 30 returns second tag 32 to airline personnel so that second tag 32 may be reused at a later time.

Unique identification codes associated with first tag 24 and second tag 32 respectively are entered into a processing computer 28 at first location 22. The unique identification codes include information relating to GPS transmitters 46 and 48 included in each of first tag 24 and second tag 32. The unique identification codes are forwarded from processing computer 28 through a network 36 to tracking station 38. First tag 24 and second tag 32 may also be scanned at first location 22. The scanning may be performed concurrently with the scanning processes of systems in current use, such as, for example the optical processes of bar-code systems.

Processing computer 28 may also assign an access code to passenger 30 that passenger 30 may use to ascertain information regarding first tag 24. The access code is given to passenger 30 and stored in database 34 in association with the identification code of second tag 32.

At tracking station 38, the unique identification codes of first tag 24 and second tag 32 are associated with one another in database 34. Additional information relating to passenger 30 may be stored in database 34 including, for example, the passenger's flight information including departure time, arrival time and duration of flight, as well as personal information about passenger 30 such as the passenger's name, address, and contact information.

At tracking station 38, the movement of object 26 is monitored as it travels from first location 22 to second location 52. First tag 24 and second tag 32 intermittently transmit tracking information to GPS Satellites 50, which then transmit the tracking information to tracking station 38. At least one processing computer at tracking station 38 periodically receives tracking information from GPS satellites 50 regarding the location of first tag 24 and second tag 32. The processing computer subsequently updates database 34 regarding the location of the object 26 and the passenger 30. For example, tracking information relating to a specific location of first tag 24 and second tag 32 at a specific time may be uploaded by the processing computer at tracking station 38 and organized into database 34.

If object 26 is steered towards an incorrect aircraft, an operator at tracking station 38 contacts airport personnel at the first location and alerts them to the misdirected luggage. For example, if, shortly before the departure of a flight, first tag 24 and second tag 32 are not detected within close proximity to each other, an operator at tracking station 38 can contact airline personnel at first location 22 and to inform them that first tag 24 may have been diverted to an incorrect aircraft. Object 26 may then be retrieved and immediately relocated to the correct aircraft. The operator at tracking station 38 can further locate passenger 30 to ascertain whether or not passenger 30 is on the correct aircraft. At a point at first location 22 or at another location between first location 22 and second location 52, such as, for example, an intervening airport where passenger 30 changes aircrafts, tracking station 38 determines the location of first tag 24 and second tag 32.

Tracking station 38 and database 34 may be accessed through network 36 by a remote communication device 39, which may include a mobile phone 40, personal computer 42, personal digital assistant (PDA) 44, or any other device for accessing information. There are numerous techniques available to direct data to a tracking station 38 and to communication device 39. For example, address headers within data packets can contain the address of specified tracking stations. Network standards include Transmission Control Protocol/Internet Protocol (TCP/IP), Internet Protocol (IP), Simple network Management Protocol (SNMP), Internetwork Packet eXchange (IPX), and various other communication protocols, any of which may be used.

After tracking station 38 and database 34 have been accessed, information relating to the location of the first tag 24 and second tag 32 can be viewed on communication device 39. Passenger 30 may send the above-mentioned access code to tracking station 38. Tracking station 38 verifies the access code with reference to database 34 and accesses information associated with the access code including the current location second tag 32, first tag 24 and any other information stored in association with these tags. Under certain circumstances passenger 30 may be denied access to data base related to tag 24 for security reasons.

Upon retrieval of object 26 at second location 52, first tag 24, if not manufactured into object 26, is uncoupled from object 26 and can be used by the airline again in association with a separate tag. Second tag 32 is collected from passenger 30 and can also be used again. Instructions to disassociate first tag 24 and second tag 32 at database 34 are sent from a processing computer at second location 52 via network 36 to tracking station 38. Tracking station 38 disassociates first tag 24 and second tag 32 so that the tags are no longer associated with each other in database 34. On subsequent use, first tag 24 may be associated with a different tag and second tag 32 may also be associated with a different tag. Reusing the tags can reduce operational costs to airlines and prevent unnecessary waste from entering the environment.

A system in accordance with the invention may further act as a deterrent against terrorism as both bags and individuals can be monitored. For example, if a passenger does not board a plane where his corresponding luggage has been loaded onto, an alarm can go off and the passenger can be located through the GPS tag in his ticket. Airline personnel would also be able to remove suspicious luggage that has been loaded onto an incorrect flight. As noted above, if first tag 24 and second tag 32 are not in close proximity to each other shortly before departure of an aircraft, the tracking station can inform airline personnel at first location 22 that either passenger 30 is not on the correct aircraft or alternatively, that object 26 is not on the correct aircraft. Under certain circumstances passenger 30 may be denied access to data base related to tag 24 for security reasons.

Figure 3:
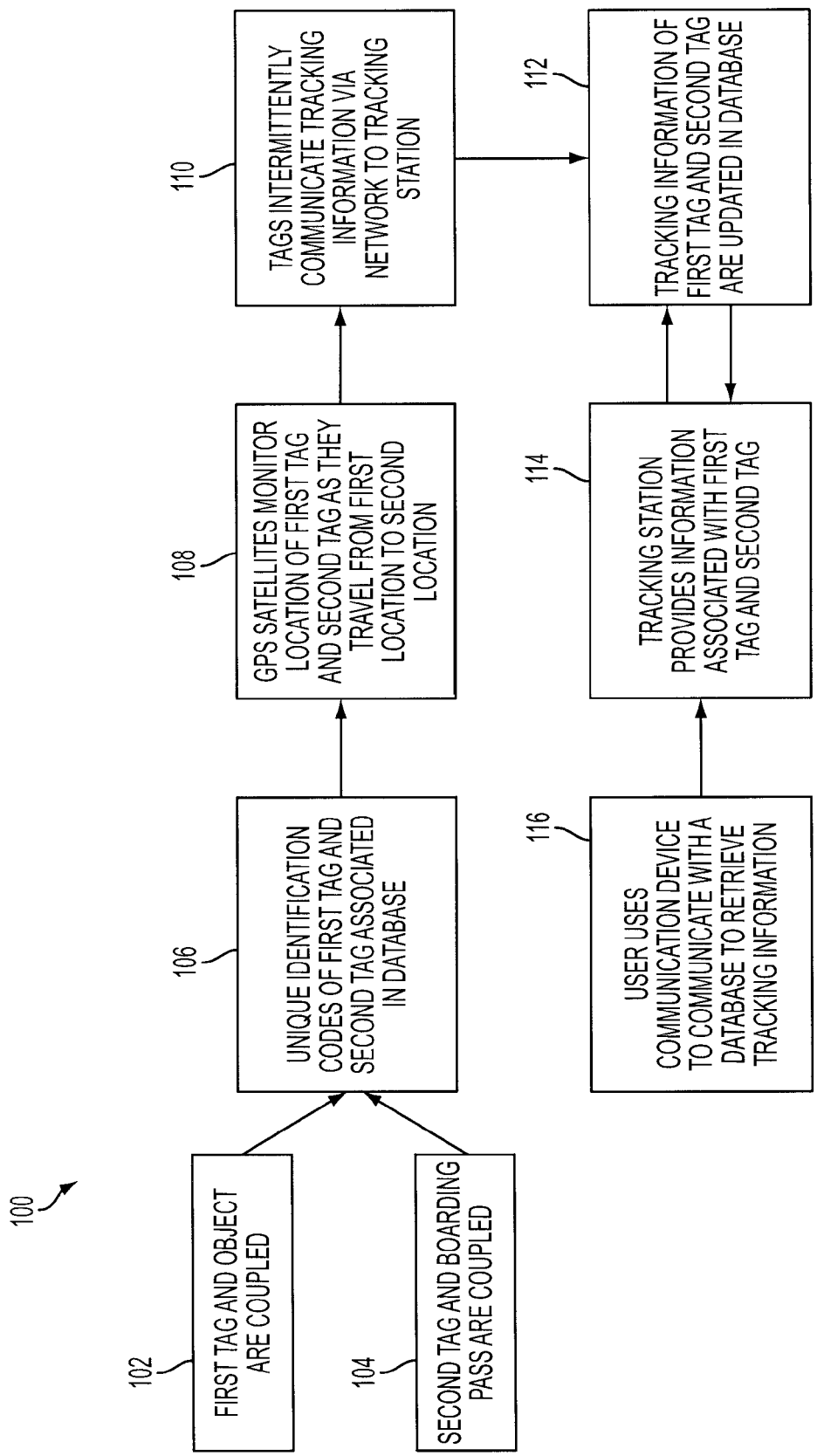
FIG. 3 is a flow diagram illustrating a process for tracking an object in accordance with embodiment of the invention.

Referring now to FIG. 3, there is shown a process 100 for tracking an object. At a first location, a first tag is coupled to an object and a second tag is coupled to a boarding pass of a passenger as noted at steps 102 and 104. Unique identification codes associated with first tag and second tag are transmitted by a processing computer over a network to a tracking station. At the tracking station, the unique identification codes of the first tag and second tag are associated with each other and are also associated with additional passenger information in a database as seen in step 106. GPS satellites monitor the movement of the first tag and the second tag as they travel from a first location to a second location as seen in step 108. The tags intermittently transfer the information regarding the longitude and latitude coordinates of the first tag and second tag through a network to a tracking station as seen in step 110. Alternatively, the tracking station may request information from the satellites regarding the location of the first tag and the second tag. At the tracking station, the location of the tags is monitored to ensure that there are no anomalies such as an object being placed on an incorrect aircraft. For example, the distance between a first tag and a second tag are monitored shortly prior to the departure time of an aircraft. If the first tag and the second tag are not in close proximity, the tracking station can generate a signal alerting contact airline personnel.

As described in step 112, the information regarding the location of the first tag and the second tag are updated intermittently in the database. As the tracking station receives information regarding the location of the first tag and the second tag from the GPS satellites the database is updated with the current information. In step 116, a user, using a communication device, such as a personal digital assistant, mobile phone or personal computer, may communicate with the tracking station over a network such as through interaction with a website. Information regarding the location of a first tag coupled to an object and a second tag coupled to a ticket of a passenger may be requested by entering a unique access code onto a verification screen of the website. In step 114, a tracking station verifies the access code and provides information associated with the code in the database such as information relating to the first tag and the second tag.

The invention has numerous advantages over current systems in the art which utilize Radio Frequency Identification (RFID) tags. The system of the invention allows objects to be tracked continuously over great distances using GPS tags. RFID tags suffer from a limited range in comparison to the GPS tags of the system. The system does not require the use of multiple tracking stations, and can function with minimal manpower and a single tracking station. Further, the system of the invention allows ready access to tracking information of both a passenger and an object during the course of a flight.

The invention can be realized in hardware, software or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention has been described with reference to an embodiment that illustrates the principles of the invention and is not meant to limit the scope of the invention. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof. Various changes may be made without departing from the spirit and scope of the invention.

The invention claimed is:

1. A system for tracking an object, the system comprising:
a tracking station in communication with a network;
a first tag coupled to the object, the first tag comprising a first tag identifier and a first Global Positioning System (GPS) transmitter, the first Global Positioning System (GPS) transmitter effective to communicate a location of the first tag to the tracking station over the network;
a second tag, assigned to a passenger, comprising a second tag identifier and a second GPS transmitter effective to communicate a location of the second tag to the tracking station over the network; and
a database in communication with the tracking station, the database effective to associate the first tag identifier with the second tag identifier and to associate the location of the first tag with the location of the second tag.

2. The system of claim 1, further comprising a communication device in communication with the tracking station, the communication device being effective to display information relating to the location of the first tag and the second tag.

3. The system of claim 2, wherein the communication device is effective to send a request to the tracking station requesting information regarding the location of the first tag.

4. The system of claim 2, wherein the communication device is one of a personal digital assistant, a personal computer and a mobile phone.

5. The system of claim 1, wherein the second tag is coupled to a passenger's ticket.

6. The system of claim 1, wherein the second tag is a GPS enabled cell phone, Personal Digital Assistant (PDA), or handheld computer.

7. The system of claim 1, wherein the first GPS transmitter and the second GPS transmitter comprise Assisted Global Positioning System (AGPS) transmitters.

8. The system of claim 1, wherein the object is an item of luggage.

9. The system of claim 8, wherein the first tag is detachably mounted to the item of luggage.

10. The system of claim 8, wherein the first tag is manufactured into the item of luggage.

11. The system of claim 1, further comprising a computer effective to receive the first and second tag identifiers, the computer further effective to forward the first and second tag identifiers to the database.

12. The system of claim 11, wherein the first tag includes an identifier effective to include information relating to the first tag readable by a scanner in communication with a computer.

13. The system according to claim 11, wherein the computer is effective to generate an access code relating to the second tag.

14. The system of claim 1, wherein the database is effective to associate passenger information including an itinerary with data relating to the first tag and second tag.

15. The system of claim 1, wherein the first tag and the second travel from a first location to a second location.

16. A method of tracking an object, the method comprising the steps of:
assigning the object a first tag comprising a first tag identifier and a first Global Positioning System (GPS) transmitter, the first Global Positioning System (GPS) transmitter effective to communicate a location of the first tag;
assigning a passenger a second tag comprising a second tag identifier and a second GPS transmitter, the second GPS transmitter effective to communicate a location of the second tag; and
associating the first tag identifier the second tag identifier and associating the location of the first tag with the location of the second tag in a database.

17. The method of claim 16, further comprising the step of:
assigning a user coupled to the second tag an access code for access to the database.

18. The method of claim 17, wherein the database includes information regarding the location of the first tag and second tag.

19. The method of claim 16, further comprising the step of:
receiving a request by the database over a network, from a communication device, for information regarding the location of the first tag; and
sending the information regarding the location of the first tag from the database to the communication device.

* * * * *